United States Patent
Mawhinney et al.

(10) Patent No.: US 6,631,119 B1
(45) Date of Patent: Oct. 7, 2003

(54) SYSTEM AND METHOD FOR MEASURING THE EFFICIENCY OF DATA DELIVERY IN A COMMUNICATION NETWORK

(75) Inventors: Ted N. Mawhinney, Clearwater, FL (US); Joseph T. Reeser, Clearwater, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/335,949

(22) Filed: Jun. 18, 1999

Related U.S. Application Data

(60) Provisional application No. 60/104,649, filed on Oct. 16, 1998.

(51) Int. Cl.[7] .............................................. H04L 12/08
(52) U.S. Cl. ...................................... 370/252; 370/230
(58) Field of Search ................................ 370/229–230, 370/231–234, 252–253, 358, 359, 384, 391, 395.21, 395.42, 419

(56) References Cited

U.S. PATENT DOCUMENTS

| | | | |
|---|---|---|---|
| 5,701,465 A | * 12/1997 | Baugher et al. | 707/10 |
| 5,982,748 A | * 11/1999 | Yin et al. | 370/232 |
| 6,067,298 A | * 5/2000 | Shinohara | 370/395.71 |
| 6,259,699 B1 | * 7/2001 | Opalka et al. | 370/398 |

* cited by examiner

Primary Examiner—Kwang Bin Yao
Assistant Examiner—Thai Hoang
(74) Attorney, Agent, or Firm—Thomas, Kayden, Horstemeyer & Risley LLP

(57) ABSTRACT

In a communication network, a system and method allow cooperating probes/access units at each end of a network connection, to mark, detect, and calculate the data delivery efficiency of the network connection for data transmitted in multiple service classifications. A trailer, which corresponds to the service classification of the data, is appended to the data at the ingress point of the network. The data, including the trailer, is then transmitted to the communication network. At the egress point of the network, the trailer is examined to determine the service classification of the data transmitted. The received data is then compared to the transmitted data for the service classification indicated by the trailer to determine the data delivery efficiency of the network connection with respect to that service classification.

27 Claims, 6 Drawing Sheets

SYSTEM AND METHOD FOR MEASURING THE EFFICIENCY OF DATA DELIVERY IN A COMMUNICATION NETWORK

CROSS REFERENCE TO RELATED APPLICATIONS

This application claims priority to and the benefit of the filing date of co-pending and commonly assigned provisional application entitled METHOD TO MEASURE FRAME AND DATA DELIVERY RATIOS FOR SERVICE LEVEL VERIFICATION WITHIN A FRAME RELAY NETWORK, assigned Ser. No. 60/104,649, filed Oct. 16, 1998, and hereby incorporated by reference.

TECHNICAL FIELD

The present invention is generally related to communication networks, and more particularly, to a system and method for allowing devices located at the ingress and egress points of a communication network to determine the efficiency of data delivery on the network by comparing the data received to the data transmitted for various service classifications.

BACKGROUND OF THE INVENTION

Historically, in the field of data communications, modems, data service units (DSU), and channel service units (CSU) have been used to convey information from one location to another. Digital technology now enables modems and other communication devices, such as frame relay data service units (DSU's) and frame relay access units (FRAU's) to communicate large amounts of data at higher speeds. The communication scheme employed by these devices generally adheres to a model, known as the Open Systems Interconnect (OSI) seven-layer model. This model specifies the parameters and conditions under which information is formatted and transferred over a given communications network. A general background of the OSI seven-layer model follows.

In 1978, a framework of international standards for computer network architecture known as "OSI" (Open Systems Interconnect) was developed. The OSI reference model of network architecture consists of seven layers. From the lowest to the highest, the layers are: (1) the physical layer; (2) the data link layer; (3) the network layer; (4) the transport layer; (5) the session layer; (6) the presentation layer; and (7) the application layer. Each layer uses the layer below it to provide a service to the layer above it. The lower layers are implemented by lower level protocols which define the electrical and physical standards, perform the byte ordering of the data, and govern the transmission, and error detection and correction of the bit stream. The higher layers are implemented by higher level protocols which deal with, inter alia, data formatting, terminal-to-computer dialogue, character sets, and sequencing of messages.

Layer 1, the physical layer, controls the direct host-to-host communication between the hardware of the end users' data terminal equipment (e.g., a modem connected to a PC).

Layer 2, the data link layer, generally fragments the data to prepare it to be sent on the physical layer, receives acknowledgment frames, performs error checking, and re-transmits frames which have been incorrectly received.

Layer 3, the network layer, generally controls the routing of packets of data from the sender to the receiver via the data link layer, and it is used by the transport layer. An example of the network layer is the Internet Protocol (IP), which is the network layer for the TCP/IP protocol widely used on Ethernet networks. In contrast to the OSI seven-layer architecture, TCP/IP (Transmission Control Protocol over Internet Protocol) is a five-layer architecture which generally consists of the network layer and the transport layer protocols.

Layer 4, the transport layer, determines how the network layer should be used to provide a point-to-point, virtual, error-free connection so that the end user devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues.

Layer 6, the presentation layer, attempts to minimize the noticeability of differences between hosts and performs functions such as text compression, and format and code conversion.

Layer 7, the application layer, is used by the presentation layer to provide the user with a localized representation of data which is independent of the format used on the network. The application layer is concerned with the user's view of the network and generally deals with resource allocation, network transparency and problem partitioning.

The communications networks that operate within the OSI seven-layer model include a number of paths or links that are interconnected to route voice, video, and/or digital data (hereinafter, collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user. This type of network is conventionally referred to as a "circuit-switching network". Accordingly, a source node of one office at one location of the network may transmit data to a destination node of a second office located at another location of the network through their respective switching facilities.

At any given location, a large number of source nodes may desire to communicate through their respective switching facilities, or interconnect node, to destination nodes at various other locations of the network. The data traffic from the various source nodes is first multiplexed through the source switching facility, and then demultiplexed at the destination switching facility, and finally delivered to the proper destination node. A variety of techniques for efficiently multiplexing data from multiple source nodes onto a single circuit of the network are presently employed in private line networks. For instance, time division multiplexing (TDM) affords each source node full access to the allotted bandwidth of the circuit for a small amount of time. The circuit is divided into defined time segments, with each segment corresponding to a specific source node, to provide for the transfer of data from those source nodes, when called upon, through the network.

Another type of network is conventionally referred to as a "packet-switching network." Frame relay networks are one implementation of a packet-switching network. Packet-switching networks, as opposed to circuit-switching networks, allow multiple users to share data network facilities and bandwidth, rather than providing a specific amount of dedicated bandwidth to each user, as in TDM. Instead, packet switches divide bandwidth into connectionless, virtual circuits. Virtual circuits can be permanent virtual circuits (PVC's) or switched virtual circuits (SVC's). As is known, virtual circuit bandwidth is consumed only when data is actually transmitted. Otherwise, the bandwidth is not used. In this way, packet-switching networks essentially mirror the operation of a statistical multiplexer (whereby multiple logical users share a single network access circuit). Frame relay generally operates within layer 2 (the data link layer) of the OSI model, and is an improvement over previous packet switching techniques, such as the industry standard X.25, in that frame relay requires significantly less overhead.

In frame relay networks, as in all communication networks, access to the network is provided by a network service provider. These service providers generally provide the communication and switching facilities over which the above-mentioned communication devices operate. Typically, an end user desirous of establishing a communications network provisions the network services in the form of a public switched service network. An example of a public switched network is the public switched telephone network (PSTN) or a public data network (PDN). These public networks typically sell network services, in the form of connectivity, to end users.

Typically a user of a public network will purchase a particular level of service from the network service provider. This level of service can be measured by, for example, network availability as a percentage of total time on the network, the amount of data actually delivered through the network compared to the amount of data attempted, or possibly the network latency, or the amount of time it takes for a particular communication to traverse the network.

Communication networks currently in use today generally do not provide guaranteed delivery of information. Instead, network service providers typically offer customers service level agreements (SLAs) which guarantee the quality of service (QoS) provided. One of the typical measurements used in these SLAs guarantees the data delivery success ratio (generically referred to as DDR) for information transported over the network. Typical SLAs will specify different DDRs depending on the service classification of the traffic being transported.

A common service classification is based on the committed information rate (CIR) purchased by the customer. The CIR is the rate at which the network agrees to transfer information under normal conditions. The CIR is the number of bits of information transferred by the network over a specific time interval ($T_c$), and is typically expressed in bits per second (bps). The committed burst size ($B_c$) is the maximum amount of data (in bits) that a network agrees to transfer under normal conditions over measurement interval $T_c$. The relationship between these parameters is $CIR=B_c/T_c$. The excess burst size ($B_e$) is the maximum amount of uncommitted data (in bits) that the network will attempt to deliver over measurement interval $T_c$. Any bits that exceed $B_c+B_e$ bits in a given measurement interval ($T_c$) are immediately subject to discard by the network.

As an example, a network service provider may offer an SLA that guarantees a 99.5% DDR for data packets transmitted within the CIR but only a 75% DDR for data packets transmitted above the CIR. These guarantees are based on the fact that during periods of network congestion data packets that exceed the CIR are discarded first in order to alleviate the congestion and decrease the likelihood that the congestion will result in the discarding of data packets transmitted within the CIR.

In frame relay networks, the generic term DDR includes both the frame delivery ratio (FDR) as well as the data delivery ratio (DDR). FDR/DDR are a set of service level parameters being proposed in the Frame Relay Forum's Service Level Definition Implementation Agreement. There are three proposed parameters for frames and three proposed parameters for data (bytes). These parameters are all based on the ratio of frames/data received divided by frames/data transmitted in particular categories. The categories being proposed are for: total frames/data (FDR/DDR), frames/data within CIR ($FDR_c/DDR_c$), and frames/data in excess of CIR ($FDR_e/DDR_e$). While not currently part of any proposed standards, additional parameters are being discussed in the industry that would add a fourth set of parameters which would measure the delivery ratio of frames/data transmitted that exceed both the CIR and the excess burst size ($B_e$) for the circuit. These parameters will be referred to herein as $FDR_{ve}/DDR_{ve}$ (for very excess).

One problem with the current state of the art is that while the DDR parameters are what the SLAs are written against, there is no accurate method of measuring these parameters for different service classifications. It is fairly straightforward to measure the total FDR/DDR parameters (i.e., total frames received vs. total frames transmitted). However, measuring $FDR_c$, $DDR_c$, $FDR_e$, $DDR_e$, $FDR_{ve}$, & $DDR_{ve}$, requires that the receiver be able to determine the service classification of each frame that it receives. However, a frame's service classification is determined by the state of the transmitter when the frame was sent and cannot be determined just by examining the received frame. Current methods in the industry typically depend on statistical measurement over large periods of time (e.g. days) and are merely estimates that fail to accurately reflect the real time status of the connection.

Two related methods for addressing this problem have been proposed. The first proposed method uses a network management system (NMS) to poll both ends of a network connection to collect statistics on frames/data transmitted (total, within CIR, and above CIR) and frames/data received (total, within CIR, and above CIR). While polling from an NMS is a common method in the industry and can be used for most types of statistical collection, this method does not work well for collecting the raw statistics needed to measure the FDR/DDR ratios as they relate to the CIR and $B_e$. A problem with this method is that the relationship to CIR for the received frames/data is measured at the egress point of the network. However, the nature of the network itself tends to smooth out the data to keep it within the CIR (i.e. frames sent into the network that are above CIR are likely to leave the network within CIR). Thus, while this method may be used to obtain a rough estimate of the FDR/DDR ratios, it does not correlate the received frames to the CIR and $B_e$ on a frame by frame basis.

The second proposed method makes use of the discard eligibility (DE) bit specified by the Frame Relay Standards. The DE bit may be set at the ingress point of the network for frames that exceed the CIR for the interface. At first glance it would seem reasonable to use the DE bit at the receiver to determine the service classification of the frame. A problem with this proposed solution, however, is that the DE bit can also be set by user equipment for reasons not based on CIR. For example, in the TCP/IP protocol widely used on Ethernet networks, the DE bit may be set to signify that the network traffic is using the user data protocol (UDP) rather than the TCP. The DE bit may also be set by intermediate switches within the frame relay network if the packet experiences congestion. Thus, although this method provides a rough estimate in some cases, it does not correlate on a frame by frame basis.

Therefore, there is a need in the industry for a system and method that overcomes these deficiencies and that enables more accurate determinations of the ratio of the data received to the data transmitted, for different service classifications, in real time.

SUMMARY OF THE INVENTION

This invention provides a system and method whereby cooperating probes/access units at each end of a logical connection in a communication network, can mark, detect, and calculate the frame/data delivery ratio for data packets being transported in multiple service classifications. Briefly described, this may be accomplished as follows:

The access unit on the ingress side of a communication network (hereinafter "the transmitter") monitors all of the data packets passing through the transmitter for a particular logical connection. As each data packet is transmitted to the network, the transmitter determines the service classification for the data packet. In one embodiment of the invention, the service classification is determined by calculating where the data packet falls in relation to the CIR for the particular logical connection (i.e., whether the data packet is: a) within CIR; b) exceeds CIR but is within $B_e$; or c) exceeds CIR and $B_e$). The transmitter then appends, in real time, a trailer to the end of the frame. The trailer is used to indicate the frame's service classification.

The access unit on the egress side of the connection (hereinafter "the receiver") monitors all of the data packets passing through the receiver for a particular logical connection. The receiver examines the trailer for each data packet to determine the data packet's service classification. The information in the receiver is then compared to the information in the transmitter to provide a precise calculation of the frame/data delivery ratios for the particular logical connection based on the service classification of each transmitted data packet.

In one embodiment of the invention, the transmitter also maintains and updates a set of transmit counters for the particular logical connection. There are counters for each service classification for the number of data packets and for the number of bytes transmitted within each class. The appropriate counters are updated when the trailer is appended and the data packet transmitted. In this embodiment, the receiver likewise maintains and updates a set of receive counters for the particular logical connection. There are counters for each service classification for the number of data packets and number of bytes received within each class. When the trailer is removed, the service classification contained in the trailer is examined and the appropriate counters are updated. The receive counters are then compared to the transmit counters to determine the frame and data delivery ratio over the logical connection for each service classification.

An advantage of the invention is that the invention provides a method to convey information in real time about the classification of a data packet from the transmitter's frame of reference to the receiver. This allows the invention to measure accurately the frame/data delivery ratios within different service classifications by comparing the data received to the data transmitted in each service classification.

Another advantage of the invention is that it avoids the problems associated with using a header to tag a data packet's service classification. If a data packet is tagged with a header, the entire packet must be assembled in the probe because the packet's service classification cannot be determined until the packet's length is known. This can add substantial delays to a packet transiting a probe. This problem is avoided by the present invention's use of a trailer, which allows the transmitter to tag a data packet's service classification without adversely affecting the latency of the packet transiting the transmitter.

Another advantage of the invention is that a single one-byte trailer can be used as an indicator for up to 256 different service classifications.

Other features of the present invention will become apparent to one with skill in the art upon examination of the following drawings and detailed description. It is intended that all such additional features be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Figure 1:
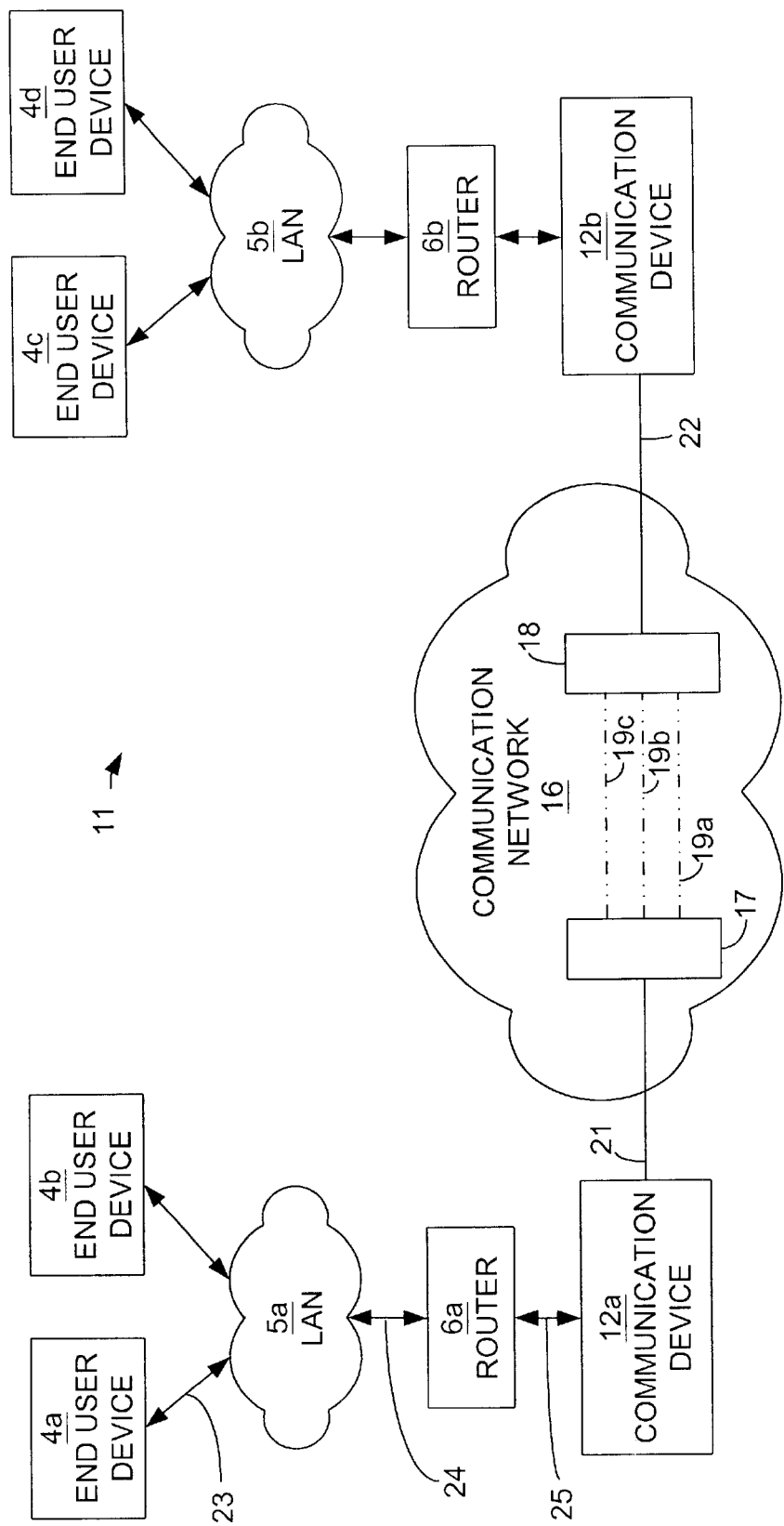
FIG. 1 is a block diagram of a simplified communication environment in which communications devices containing the delivery efficiency logic of the present invention operate.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

The delivery efficiency logic of the present invention can be implemented in software, hardware, or a combination thereof. In a preferred embodiment, the delivery efficiency logic is implemented in software that is stored in a memory and that is executed by a suitable microprocessor (uP) situated in a communications device. However, the delivery efficiency program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Furthermore, the preferred embodiment of the delivery efficiency logic is illustrated in the context of a frame relay communications network; however, the concepts and principles of the delivery efficiency logic are equally applicable to other communication techniques, such as X.25.

FIG. 1 shows a simplified communication environment 11 in which communications devices containing the delivery efficiency logic operate. In general, the communication environment includes a plurality of end user devices 4a, 4b, 4c, and 4d, a plurality of Local Area Networks (LANs) 5a and 5b, a plurality of routers 6a and 6b, and a plurality of communication devices 12a and 12b. For simplicity only two communication devices are depicted in FIG. 1. In practice, communication environment 11 will typically contain many such communication devices. Each of the plurality of end user devices 4a, 4b, 4c and 4d is connected via one of the LANs 5a and 5b and one of the routers 6a and 6b to one of the communication devices 12a and 12b. Illustratively, end user device 4a is connected to LAN 5a over connection 23, LAN 5a is connected to router 6a over connection 24, and router 6a is connected to communication device 12a over connection 25.

In the preferred embodiment, communication devices 12a and 12b are illustratively frame relay access units (FRAU's). FRAU's 12a and 12b communicate over communication network 16 in a conventional manner. Communication network 16 can be for example any public network that provides connectivity for FRAU's 12a and 12b, and in the preferred embodiment is a frame relay communication network. Communication network 16 illustratively connects to FRAU's 12a and 12b over connections 21 and 22, respectively. Connections 21, 22, 23, 24 and can be physical links and can be, for example, T1/E1 service, T3/E3 service, digital data service (DDS), a synchronous data link, or a LAN.

Communication network 16 is typically characterized by a mesh network of links (not shown) interconnecting a matrix of intermediate nodes (not shown) through frame relay switches 17 and 18. For simplicity only two frame relay switches are illustrated herein; however, communication network 16 will typically contain many switching devices. The links are identified by data link connection identifiers (DLCI's), which are used to identify the logical connection over which the subject data is transported. The use of DLCI's allows multiple logical connections to be multiplexed over the same channel. Alternatively, in the case of an asynchronous transfer mode (ATM) network, virtual path identifiers/virtual channel identifiers (VPI's/VCI's) are used to identify the logical connection over which the subject data is transported.

Information is communicated over the communication network 16 in discrete packets, which may be multiplexed across shared or common communication links. For example, FRAU 12a may communicate with FRAU 12b over a predefined communication path or link within the frame relay network. This communication path will generally be defined by a number intermediate nodes. The communication link that interconnects FRAU 12a and FRAU 12b may be completely separate and distinct from the link that interconnects FRAU 12a with other FRAUs (not shown) in the communication environment 11. Alternatively, a segment of the two above-described communication links may be shared. Whether the links are separate or shared is a function of a number of factors, and generally is determined by the service provider.

Within communication network 16 the communication path between FRAU 12a and FRAU 12b, for example, will be the same in both directions. That is, data transmitted from FRAU 12a to FRAU 12b will traverse the same path (i.e., interconnecting, intermediate nodes) as will data transmitted from FRAU 12b to FRAU 12a. This path of intermediate nodes is defined by DLCI's, and is commonly referred to as a permanent virtual circuit (PVC). This name derives from the fact that the circuit is permanent in that it does not change from transmission to transmission. It is, however, virtual in the sense that a unitary physical connection (such as a dedicated leased line) is not established and maintained between the two end users. If for some reason the service provider decides to change the interconnecting path (i.e., reconfigure or redefine the intermediate nodes), the service provider can provision a new set of DLCI's that will be used to properly route the data from end user to end user. DLCI's are assigned to and define all the points in a network through which data passes. For simplicity the delivery efficiency logic of the present invention is described herein as applied to permanent virtual circuits (PVC's); however, the delivery efficiency logic of the present invention is equally applicable to communication networks employing switched virtual circuits (SVC's). Still referring to FIG. 1, PVC's 19a, 19b, and 19c illustrate the concept of multiple communication paths within communication network 16.

Figure 2:
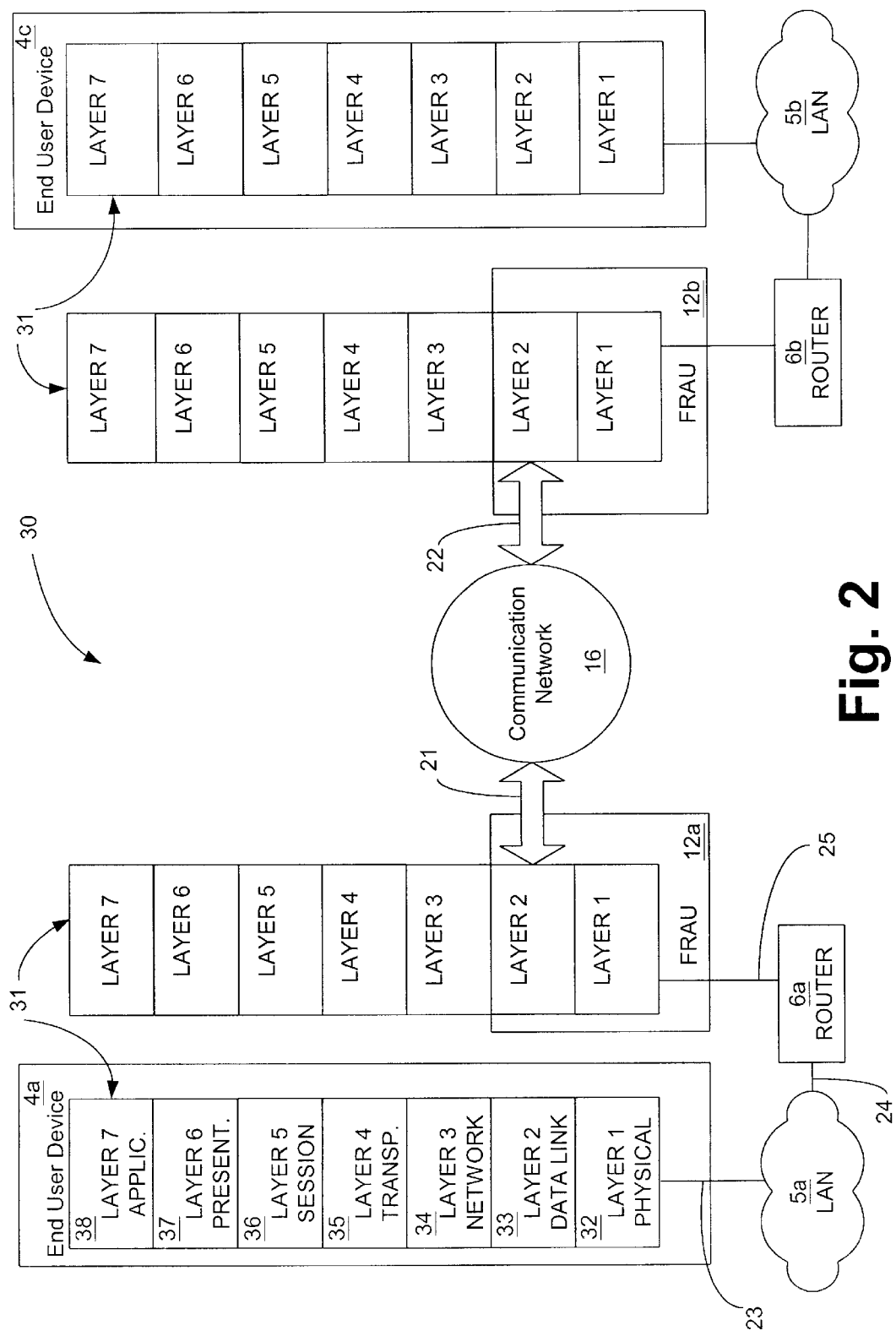
FIG. 2 is a block diagram of a network model illustrating the layers of the OSI seven-layer model in which devices employing the delivery efficiency logic of the present invention operate.

FIG. 2 is a block diagram of a network model illustrating the layers of the OSI seven-layer model in which devices employing the delivery efficiency logic of the present invention operate. As discussed hereinafter with respect to FIG. 3, the delivery efficiency logic of the present invention resides within each communication device 12a and 12b, which is illustratively a FRAU. FRAUs 12a and 12b are typically the devices that connect end user devices 4a and 4c (through LANs 5a and 5b and routers 6a and 6b) to the communication network 16, which is illustratively a frame relay network. FRAUs 12a and 12b typically communicate over frame relay network 16 using layer 2 (the data link layer 33, of the OSI seven-layer model 31). FRAUs 12a and 12b, however, are also aware of layer 1 (the physical layer 32 of the OSI seven-layer model), since FRAUs 12a and 12b each contain a physical layer access device, such as a DSU. The data link layer 33 contains the standards and protocols (including the logical management interface (LMI)) that enable the transport of frame relay data. The physical layer 32 includes the hardware connections and physical media that enable the transport of information over the network.

Figure 3:
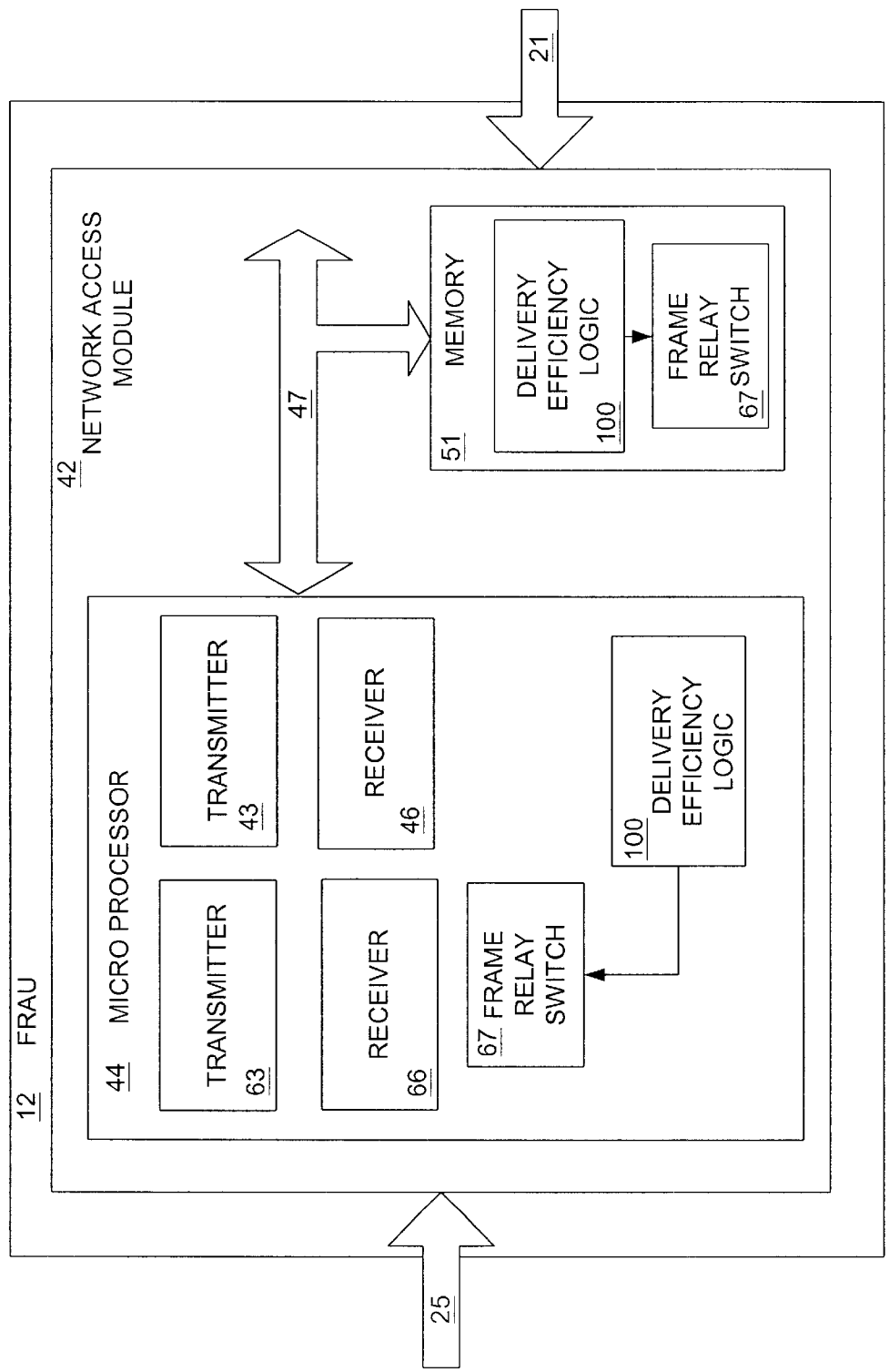
FIG. 3 is a block diagram illustrating a communication device employing the delivery efficiency logic of the present invention.

Referring now to FIG. 3, shown is a schematic view illustrating a communications device, for example but not limited to, a FRAU 12, containing the delivery efficiency logic 100 of the present invention. FRAU 12 contains network access module (NAM) 42, which includes a number of conventional components that are well known in the art of data communications. Microprocessor (uP) 44 is configured to control the operation of the FRAU's transmitters 43 and 63, and receivers 46 and 66, as well as frame relay switch 67. Microprocessor (uP) 44 is also configured to couple to memory 51 over bus 47.

Communication channel 21 is typically the physical wire that extends from a frame relay network and connects to NAM 42 to provide access into the frame relay, or other, communication network. However, communication channel 21 can be any medium for connecting the FRAU 12 to a communication network. Communication between the FRAU 12 and communication channel 21 is effected through transmitter 43 and receiver 46.

Likewise, communication channel 25 is typically the physical wire that extends from router 6 to NAM 42 to provide access between FRAU 12 and router 6. However, communication channel 25 can be any medium for connecting the FRAU 12 to router 6. Communication between the FRAU 12 and communication channel 25 is effected through transmitter 63 and receiver 66.

Also included in FRAU 12 is memory 51 which includes the delivery efficiency logic 100 of the present invention and frame relay switch 67. Delivery efficiency logic 100 is configured to enable and drive uP 44 to provide the monitoring and control of network traffic through communication devices 12a and 12b over communication network 16 of FIG. 1. Illustratively, the delivery efficiency logic 100 of the present invention resides in all FRAU's. Because delivery efficiency logic 100 can be an algorithm that is executed by uP 44, it is depicted as residing within both memory 51 and uP 44. Similarly, frame relay switch 67 resides in memory 51 and executes in uP 44.

Figure 4A:
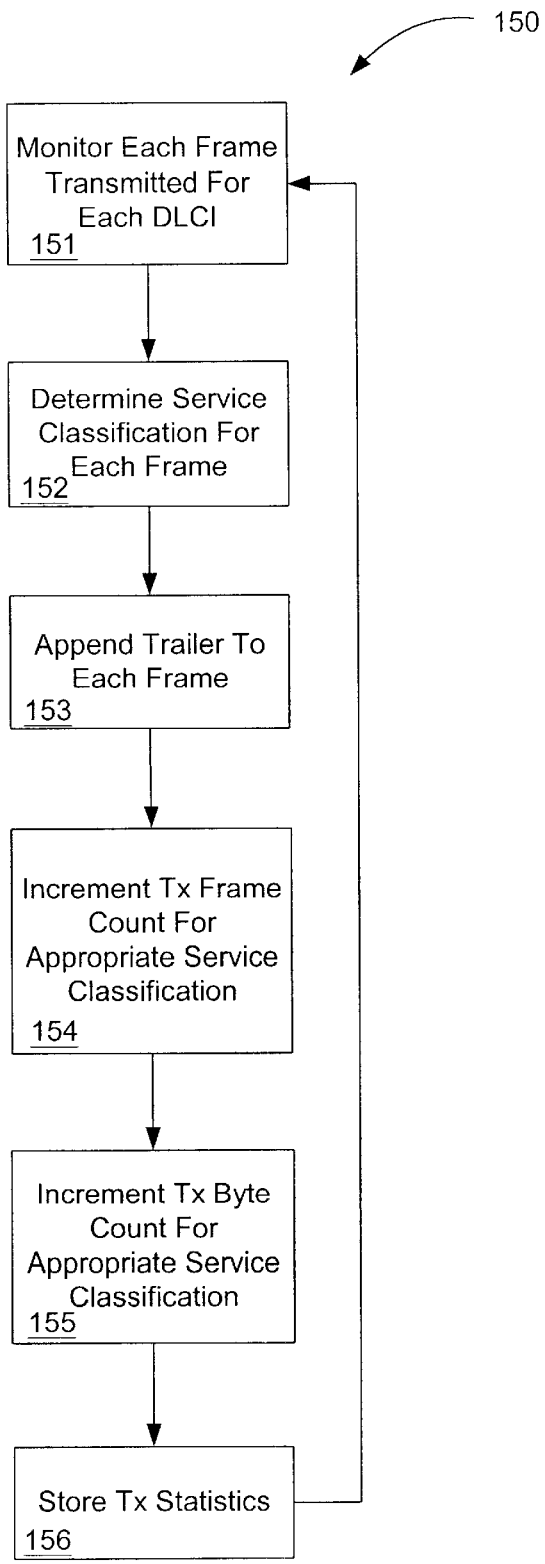
FIGS. 4A, 4B and 4C are flow diagrams illustrating the operation of the delivery efficiency logic of FIG. 3.
Figure 4B:
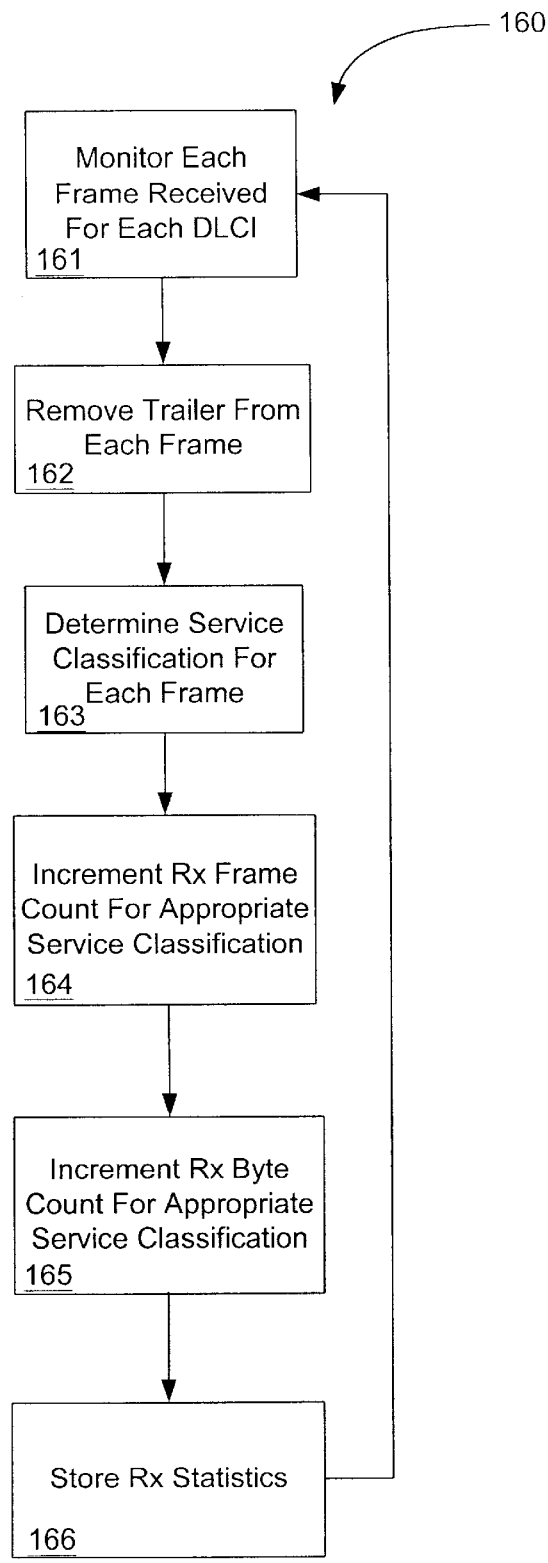
Figure 4C:
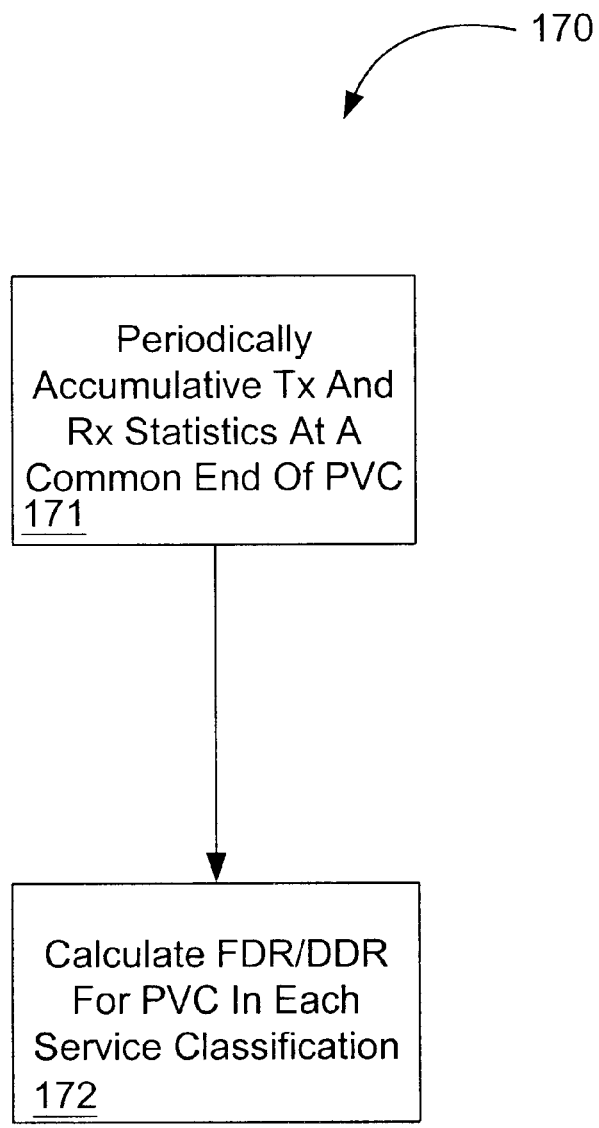

FIGS. 4A, 4B and 4C are flow diagrams illustrating the operation of the delivery efficiency logic 100 of FIG. 3. Delivery efficiency logic 100 illustratively comprises three related modules 150, 160 and 170, which are illustrated in FIGS. 4A, 4B and 4C, respectively.

With reference to FIG. 4A, module 150, which comprises steps 151 through 156, executes continuously in an access unit on the ingress side of the connection (hereinafter "the transmitter"). In step 151, the logic monitors each of the frames that passes through the transmitter for a particular logical connection. In the case of a frame relay network, the transmitter is illustratively a FRAU and the particular logical connection is a permanent virtual circuit (PVC). The FRAU monitors all transmitted frames for each data link connection identifier (DLCI). The size of the frame is determined when the segment containing the last byte is ready for transmission.

In step 152, the logic determines the service classification for each frame. This calculation cannot be performed until the last byte of the frame is present in the access unit. In order to minimize the latency for the frame, in a preferred embodiment the frame is not buffered within the unit. Instead, it is "pipelined" directly to the network as soon as the first few bytes are received by the access unit. Alternatively, transmission may be delayed until the entire frame is present in the access unit. In either case, when the last byte is present in the access unit, the size of the frame is used to determine the frame's service classification. In this example, three service classifications may be indicated: a) the frame is within CIR (i.e. less than B. bits); b) the frame exceeds CIR but is within $B_e$ (i.e. greater than $B_c$ bits but less than $B_e$ bits); or c) the frame exceeds CIR+$B_e$ (i.e. greater than $B_c$+$B_e$ bits). However, this is for illustrative purposes only, and in practice a single one-byte trailer can be used to indicate up to 256 different service classifications.

In step 153, the logic in the transmitter appends, in real time, a trailer to the end of the frame. In a preferred embodiment, the trailer is one byte long. The bits in the trailer are set to indicate the frame's service classification.

In one embodiment of the invention, the logic in the transmitter also maintains and updates a set of transmit counters for the particular circuit. There are counters for each service classification for the number of frames and number of bytes transmitted within each class. When the trailer is appended and the frame transmitted, the appropriate counters are updated based on the length of the frame. Thus, in step 154 the logic increments the frame count for the appropriate service classification (e..g. frames transmitted ("$T_x$ frames") within CIR, $T_x$ frames between CIR and $B_e$, and $T_x$ frames in excess of $B_e$). Likewise, in step 155 the logic increments the byte count for the appropriate service classification by the number of bytes in the frame (e.g., bytes transmitted ("$T_x$ bytes") within CIR, $T_x$ bytes between CIR and $B_e$, and $T_x$ bytes in excess of $B_e$).

In step 156, the logic stores the $T_x$ frames information and the $T_x$ bytes information, which collectively comprise the statistics relevant to the frames and bytes transmitted in each service classification (referred to hereinafter collectively as the "$T_x$ statistics").

With reference to FIG. 4B, module 160, which comprises steps 161 through 166, executes continuously in an access unit on the egress side of the logical connection (hereinafter "the receiver"). In step 161, the logic monitors each of the frames received for each DLCI on a particular logical connection (PVC). As was the case with the transmitter, the frame is "pipelined" in real time to the user equipment. The size of the frame is determined when the segment containing the last byte is received.

When the end of the frame is received, in step 162 the trailer is removed and the frame is closed. There are at least two methods of identifying frames that have a trailer. The access units at each end of the connection can be preconfigured on a per circuit basis to support DDR calculations, which means that all frames for the circuit contain a trailer. Alternatively, an escape flag can be embedded in the data packet to indicate the presence of the trailer. The method used to imbed an escape flag in the data stream is described in commonly assigned U.S. Pat. No. 5,654,966, which is hereby incorporated in this application by reference.

In step 163, the trailer is examined to determine the service classification in which the frame was transmitted.

In one embodiment, the logic in the receiver maintains and updates a set of receive counters for the particular circuit. There are counters for each service classification for the number of frames and number of bytes received within each class. When the trailer is removed, the service classification contained in the trailer is examined and the appropriate counters are updated based on the length of the frame. Thus, in step 164 the logic increments the frame count for the appropriate service classification (e..g. frames received ("$R_x$ frames") within CIR, $R_x$ frames between CIR and $B_e$, and $R_x$ frames in excess of $B_e$). Likewise, in step 165 the logic increments the byte count for the appropriate service classification by the number of bytes in the frame (e.g., bytes received ("$R_x$ bytes") within CIR, $R_x$ bytes between CIR and $B_e$, and $R_x$ bytes in excess of $B_e$).

In step 166, the logic stores the $R_x$ frames information and the $R_x$ bytes information, which collectively comprise the statistics relevant to the frames and bytes transmitted in each service classification (referred to hereinafter collectively as the "$R_x$ statistics").

At this point the $T_x$ and $R_x$ statistics are available to provide precise calculation of the frame/data delivery ratios for the different service classifications. The logic in the transmitter contains the $T_x$ statistics (i.e, the frame and byte counts for all frames transmitted within each service classification), and the logic in the receiver contains the $R_x$ statistics (i.e., the frame and byte counts for all frames received within each service classification).

The FDR and DDR ratios for the PVC are calculated in module 170, which is illustrated in FIG. 4C. In contrast to modules 150 and 160, which execute continuously, module 170, which comprises steps 171 and 172, executes periodically. As explained hereinafter, module 170 may execute on either the ingress side (i.e., at the transmitter) or on the egress side (i.e., at the receiver) of a particular PVC.

With reference to FIG. 4C, in step 171 the logic periodically accumulates the $T_x$ statistics and the $R_x$ statistics at a common end of the PVC connection (i.e., either at the transmitter or the receiver). The statistics may be accumulated for any period of time that is of interest to the user (e.g., daily, weekly, monthly, etc.). One method by which step 171 may be accomplished is by using the system and method described in co-pending, commonly assigned U.S. patent application Ser. No. 09/144,926, filed Sep. 1, 1998, entitled "SYSTEM AND METHOD FOR THE MEASUREMENT OF SERVICE QUALITY IN A COMMUNICATIONS NETWORK", which is hereby incorporated in this application by reference.

In step 172 the logic calculates the frame/data delivery ratios for the PVC by comparing the $R_x$ statistics to the $T_x$ statistics. The following example shows the FDR and DDR calculations for the "frame sent within CIR" service classification:

$FDR_c = R_x$ frames within CIR/$T_x$ frames within CIR
$DDR_c = R_x$ bytes within CIR/$T_x$ bytes within CIR
Similar calculations may be performed for $FDR_e$, $DDR_e$, $FDR_{ve}$, and $DDR_{ve}$.

It will be apparent to those skilled in the art that many modifications and variations may be made to the preferred embodiments of the present invention, as set forth above, without departing substantially from the principles of the present invention. For example, while the above description describes only three service classifications the invention is not limited to the specific service classifications discussed, and the invention can be expanded to include an unlimited number of service classifications (up to 256 with a one-byte trailer, more by expanding the size of the trailer). Likewise, while the above description is made with reference to a frame relay network, the principles of the present invention are equally applicable to other communication services such as, for example but not limited to X.25. All such modifications and variations are intended to be included herein within the scope of the present invention, as defined in the claims that follow.

Therefore, having thus described the invention, at least the following is claimed:

1. A method for determining the efficiency of data delivery in a packet-switching communication network, the communication network enabling the flow of data to and from a plurality of end user devices that are connected to the network through a plurality of communication devices, the method comprising the steps of:

determining a service classification for each packet in a plurality of data packets at an ingress point to the communication network;

appending a trailer to each of said data packets, said trailer indicating said service classification of said data packet;

counting the number of data packets entering the communication network at said ingress point for each service classification over a specific time interval;

transmitting the plurality of data packets over the communication network from the ingress point;

receiving the plurality of data packets at an egress point to the communication network;

examining said trailers to determine said service classification of each of the plurality of data packets at the egress point;

counting the number of data packets exiting the communication network at said egress point for each service classification over the specific time interval;

accumulating the number counted at said ingress point and the number counted at said egress point; and comparing the number of data packets for a particular service classification received at said egress point over the specific time interval to the number of data packets transmitted from said ingress point over the specific time interval for the same service classification.

2. The method of claim 1, wherein the communication network is a frame relay network.

3. The method of claim 1, wherein said trailer is one byte long.

4. The method of claim 3, wherein said trailer is used to indicate up to 256 different service classifications.

5. The method of claim 1, wherein said method is performed in a first communication device located at an ingress point to the communication network and a second communication device located at an egress point to the communication network.

6. The method of claim 5, wherein said communication devices are frame relay access units (FRAUs).

7. The method of claim 1, wherein the comparing step further comprises the step of:

determining, for each service classification, the ratio of the number of data packets exiting the communication network over the specific time interval to the number of data packets entering the communication network over the specific time interval.

8. The method of claim 1, wherein the comparing step further comprises the steps of:

counting the number of bytes entering the communication network at said ingress point for each service classification over the specific time interval; and counting the number of bytes exiting the communication network at said egress point for each service classification over the specific time interval.

9. The method of claim 8, wherein the comparing step further comprises the step of:

determining, for each service classification, the ratio of the number of bytes exiting the communication network over the specific time interval to the number of bytes entering the communication network over the specific time interval.

10. A system for determining the efficiency of data delivery in a packet-switching communication network, the communication network enabling the flow of data to and from a plurality of end user devices that are connected to the network through a plurality of communication devices, comprising:

means for determining a service classification for each packet in a plurality of data packets at an ingress point to the communication network;

means for appending a trailer to each of said data packets, said trailer indicating said service classification of said data packet;

means for counting the number of data packets entering the communication network at said ingress point for each service classification over a specific time interval;

means for transmitting the plurality of data packets over the communication network from the ingress point;

means for receiving the plurality of data packets at an egress point to the communication network;

means for examining said trailers to determine said service classification of each of the plurality of data packets at the egress point;

means for counting the number of data packets exiting the communication network at said egress point for each service classification over the specific time interval;

means for accumulating the number counted at said ingress point and the number counted at said egress point; and means for comparing the number of data packets for a particular service classification received at said egress point over the specific time interval to the number of data packets transmitted from said ingress point over the specific time interval for the same service classification.

11. The system of claim 10, wherein said communication network is a frame relay network.

12. The system of claim 10, wherein said trailer is one byte long.

13. The system of claim 12, wherein said trailer is used to indicate up to 256 different service classifications.

14. The system of claim 10, wherein said system is implemented in a first communication device located at an ingress point to the communication network and a second communication device located at an egress point to the communication network.

15. The system of claim 14, wherein said communication devices are frame relay access units (FRAUs).

16. The system of claim 11, further comprising:

means for determining, for each service classification, the ratio of the number of data packets exiting the communication network over the specific time interval to the number of data packets entering the communication network over the specific time interval.

17. The system of claim 10, further comprising:

means for counting the number of bytes entering the communication network at said ingress point for each service classification over the specific time interval; and means for counting the number of bytes exiting the communication network at said egress point for each service classification over the specific time interval.

18. The system of claim 17, further comprising:

means for determining, for each service classification, the ratio of the number of bytes exiting the communication network over the specific time interval to the number of bytes entering the communication network over the specific time interval.

19. A computer readable medium having a program for determining the efficiency of data delivery in a packet-switching communication network, the communication network enabling the flow of data to and from a plurality of end user devices that are connected to the network through a plurality of communication devices, the program comprising logic configured to perform the steps of:

determining a service classification for each packet in a plurality of data packets at an ingress point to the communication network;

appending a trailer to each of said data packets, said trailer indicating said service classification of said data packet;

counting the number of data packets entering the communication network at said ingress point for each service classification over a specific time interval;

transmitting the plurality of data packets over the communication network from the ingress point;

receiving the plurality of data packets at an egress point to the communication network;

examining said trailers to determine said service classification of each of the plurality of data packets at the egress point;

counting the number of data packets exiting the communication network at said egress point for each service classification over the specific time interval;

accumulating the number counted at said ingress point and the number counted at said egress point; and comparing the number of data packets for a particular service classification received at said egress point over the specific time interval to the number of data packets transmitted from said ingress point over the specific time interval for the same service classification.

20. The program of claim 19, wherein said communication network is a frame relay network.

21. The program of claim 19, wherein said trailer is one byte long.

22. The program of claim 21, wherein said trailer is used to indicate up to 256 different service classifications.

23. The program of claim 19, wherein said program is executed in a first communication device located at an ingress point to the communication network and a second communication device located at an egress point to the communication network.

24. The program of claim 23, wherein said communication devices are frame relay access units (FRAUs).

25. The program of claim 19, wherein the logic configured to perform the comparing step further comprises logic configured to perform the step of:

determining, for each service classification, the ratio of the number of data packets exiting the communication network over the specific time interval to the number of data packets entering the communication network over the specific time interval.

26. The program of claim 19, wherein the logic configured to perform the comparing step further comprises logic configured to perform the steps of:

counting the number of bytes entering the communication network at said ingress point for each service classification over the specific time interval; and counting the number of bytes exiting the communication network at said egress point for each service classification over the specific time interval.

27. The program of claim 26, wherein the logic configured to perform the comparing step further comprises logic configured to perform the step of:

determining, for each service classification, the ratio of the number of bytes exiting the communication network over the specific time interval to the number of bytes entering the communication network over the specific time interval.

* * * * *